(No Model.)
F. W. FLOYD.
TOE WEIGHT.
No. 399,253. Patented Mar. 12, 1889.
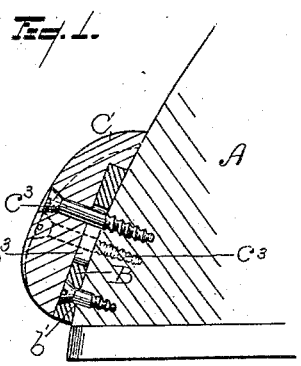
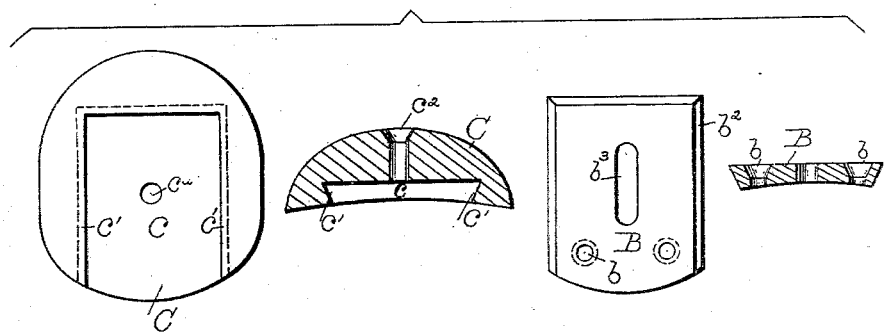
WITNESSES
Samuel E. Thomas
M. B. O'Dogherty.
INVENTOR
Frank W. Floyd
By W. W. Leggett,
Attorney

UNITED STATES PATENT OFFICE.

FRANK W. FLOYD, OF DETROIT, MICHIGAN.

TOE-WEIGHT.

SPECIFICATION forming part of Letters Patent No. 399,253, dated March 12, 1889.

Application filed August 21, 1888. Serial No. 283,299. (No model.)

*To all whom it may concern:*

Be it known that I, FRANK W. FLOYD, a citizen of the United States, residing at Detroit, county of Wayne, State of Michigan, have invented a certain new and useful Improvement in Toe-Weights for Horses; and I declare the following to be a full, clear, and exact description of the same, such as will enable others skilled in the art to which it appertains to make and use the same, reference being had to the accompanying drawings, which form a part of this specification, and in which—

Figure 1 represents a section of a horse's hoof with my toe-weight attached thereto. Fig. 2 is a view of the parts used in the construction of my toe-weight.

The object of my invention is to provide a construction of toe-weight wherein the weight or ball may be easily removed from the hoof and a lighter or heavier weight be substituted, if desired.

In the drawings, A represents the horse's hoof. B represents a plate or spur having its inner surface concave to fit the convex surface of the hoof, and provided with holes $b$ at the lower end for the reception of the screws $b'$, used in fastening the spur to the hoof. The edges $b^2$ are dovetailed to fit the dovetailed edges $c'$ of the recess $c$ in the weight C. This weight C has an orifice, $c^2$, for the reception of a screw, $c^3$, adapted to pass through an elongated opening, $b^3$, in the spur B and into the hoof A. Thus the weight is held not only by the spur B, which forms a tenon, and which is in turn fastened to the hoof by the screws in the lower end, but is strengthened in its hold by the screw $c^3$, passing through the weight and spur and into the hoof. By making the opening $b^3$ in the spur elongated any size weight desired may be slipped onto the spur and its strengthening-screw $c^3$ be permitted to pass through the spur and into the hoof; also, this screw $c^3$ is maintained always at the same relative point in each weight, and is usually located in such position as to prevent any tendency of the weight to fly out at the bottom rather than at the top, or vice versa. By this construction, as will be seen, the weight is firmly held in place, and can be removed and a different size substituted by simply removing the single screw $c^3$, and the weight be adjusted to a higher or lower position, according to its size.

What I claim is—

1. In a toe-weight for horses, the combination of a dovetailed tenon-spur concaved to fit the convexed surface of the hoof and provided with screw-holes, screws passed through the lower end of said spur into the hoof, a mortised weight fitted onto the spur, and a screw passed through said weight and spur into the hoof, substantially as described.

2. In a toe-weight for horses, the combination, with the spur B, having its inner surface concave to fit the convex surface of the hoof and provided with screw-holes $b$, an elongated opening, $b^3$, and beveled edges $b^2$, of the weight C, provided with a recess, $c$, having its edges beveled to fit the edges of the spur B, an orifice, $c^2$, and the screw $c^3$, which passes into the hoof, substantially as described.

3. In a toe-weight for horses, a dovetail tenon-spur with screw-holes at its lower end and an elongated opening, $b^3$, in combination with a weight having a dovetail mortise to fit the tenon and a screw-hole, $c^2$, substantially as described.

In testimony whereof I sign this specification in the presence of two witnesses.

FRANK W. FLOYD.

Witnesses:
M. B. O'DOGHERTY,
W. H. CHAMBERLIN.